US005620163A

United States Patent [19]
Wu

[11] Patent Number: 5,620,163
[45] Date of Patent: Apr. 15, 1997

[54] SUPPORTING CLIP DEVICE

[76] Inventor: Ko-Lee Wu, 1F, No. 7, Lane 26, Chien Kong St., Shih Lin, Taipei, Taiwan

[21] Appl. No.: 411,516

[22] Filed: Mar. 28, 1995

[51] Int. Cl.$^6$ ................................................ A47G 29/00
[52] U.S. Cl. .......................................................... 248/688
[58] Field of Search ............................ 248/688, 676, 248/465, 457, 121, 316.7, 452

[56] References Cited

U.S. PATENT DOCUMENTS

| 4,044,980 | 8/1977 | Cummins | 248/676 X |
|---|---|---|---|
| 4,856,748 | 8/1989 | Obermeyer | 248/688 |
| 4,940,204 | 7/1990 | Nelson et al. | 248/688 |
| 5,052,650 | 10/1991 | Beile et al. | 248/465 X |
| 5,152,490 | 10/1992 | Deutsch | 248/457 X |
| 5,161,771 | 11/1992 | Domeier | 248/676 |
| 5,503,361 | 4/1996 | Kan-O et al. | 248/688 |

Primary Examiner—Kenneth J. Dorner
Assistant Examiner—Jerry Redman

[57] ABSTRACT

A supporting clip device for associating with a housing or a leather case of a mobile telephone or pager. The clip device includes a clip member and a foldable/stretchable support member which can be pivoted from the clip member through a certain angle so as to support the mobile telephone or pager at a position 45 degrees inclined to a plane surface for achieving better signal receiving ability and appearance.

2 Claims, 8 Drawing Sheets

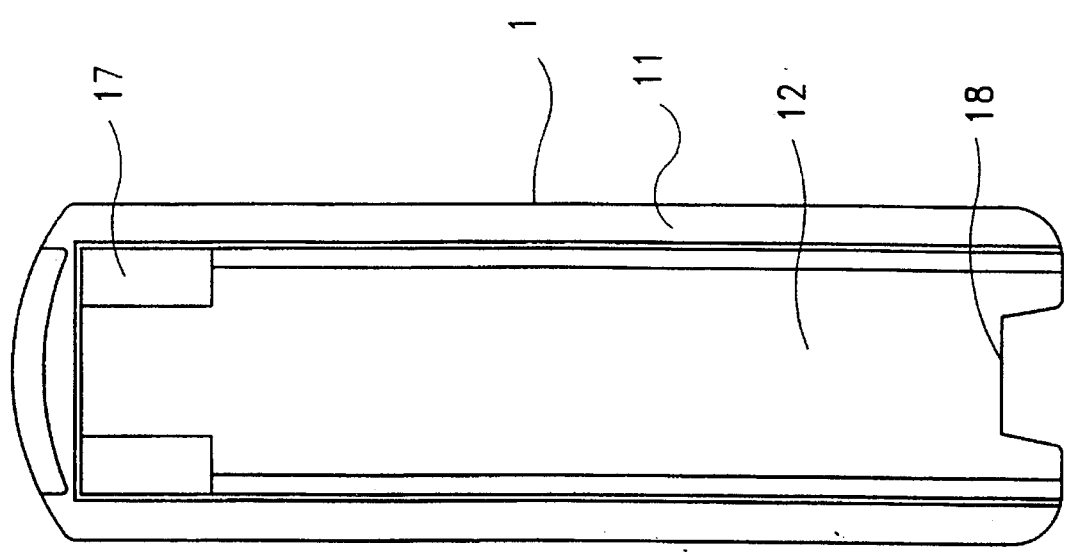
FIG.4
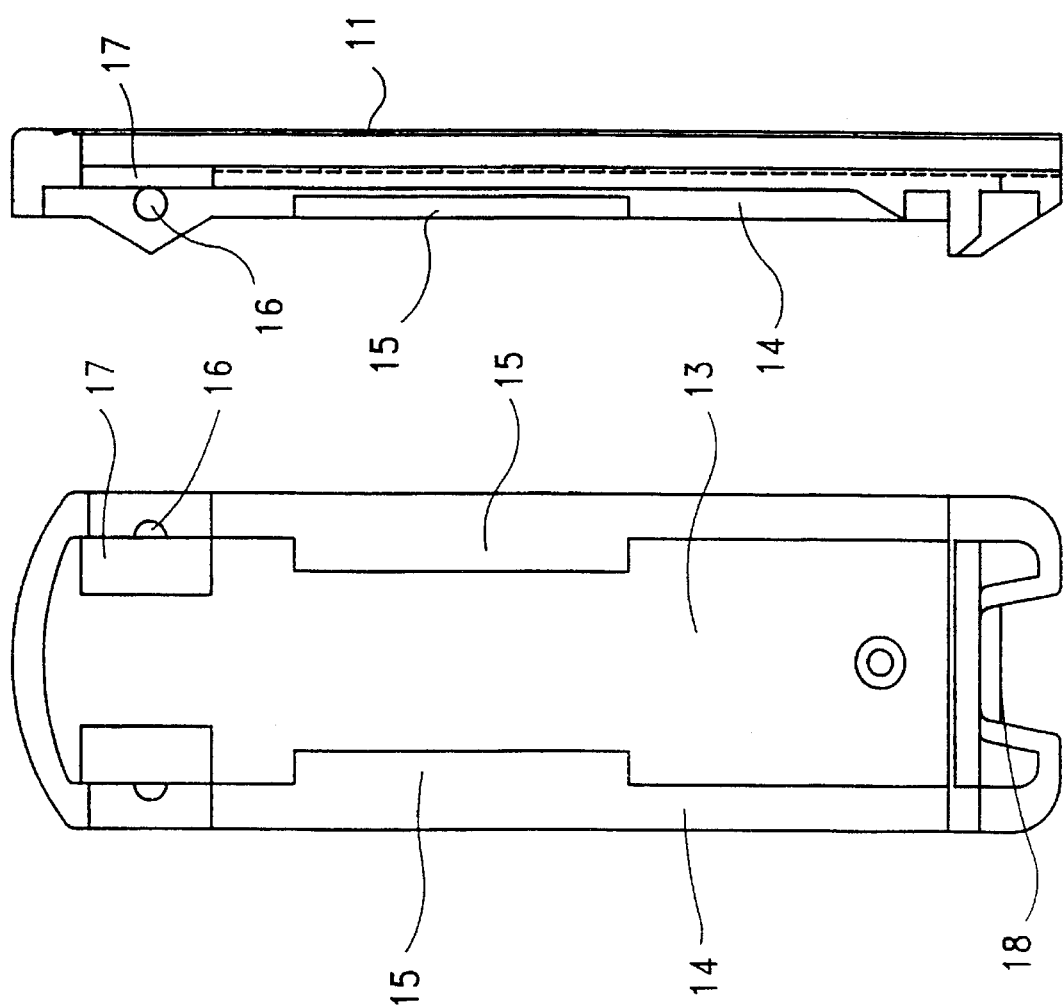
FIG.6
FIG.5

5,620,163

SUPPORTING CLIP DEVICE

BACKGROUND OF THE INVENTION

The present invention relates to a clip device with a support member, and more particularly to a clip device including a support member capable of supporting a mobile telephone or a pager at a position 45 degrees inclined to a plane surface on which the telephone or pager is placed so as to achieve better signal receiving ability and appearance.

A current mobile telephone, pager or active communicator is equipped with a clip member on the back face for fastening the device on the waist or belt of a user and facilitating the carriage of the device. However, when placed on a plane surface such as a table face, because the clip member projects outward from the device, the device is often placed on the surface with the front face (signal-receiving and transmitting portion) of the device faced downward while with the clip member faced upward. When placed in such manner, the device is not visually ideal and the receiving ability of the device is adversely affected. This is because that the antenna of the above active communicator is fixedly disposed on the top thereof for best reception and when horizontally placed on the table face, the receiving antenna is not positioned on the highest level so that the receiving ability of the communicator is adversely affected.

SUMMARY OF THE INVENTION

It is therefore a primary object of the present invention to provide a clip device including a support member, whereby when a mobile telephone, a pager or an active communicator is placed on a plane surface, the support member is capable of supporting the above communicator at such a position that the signal receiving antenna thereof is located on a level higher than the plane surface so as to achieve better signal receiving ability.

It is a further object of the present invention to provide a clip device including a clip member and a foldable/stretchable support member which can be pivoted from the clip member through a certain angle so as to support a mobile telephone, a pager or an active communicator at a position inclined to a plane surface. When not used, the support member can be received in a recess of the clip member without interfering the use thereof.

The present invention can be best understood through the following description and accompanying drawings, wherein:

BRIEF DESCRIPTION OF THE DRAWINGS

FIG. 4 is a front view of the clip member of the clip device of the present invention;

FIG. 5 is a rear view thereof;

FIG. 6 is a side view thereof;

DETAILED DESCRIPTION OF THE PREFERRED EMBODIMENT

Figure 1:
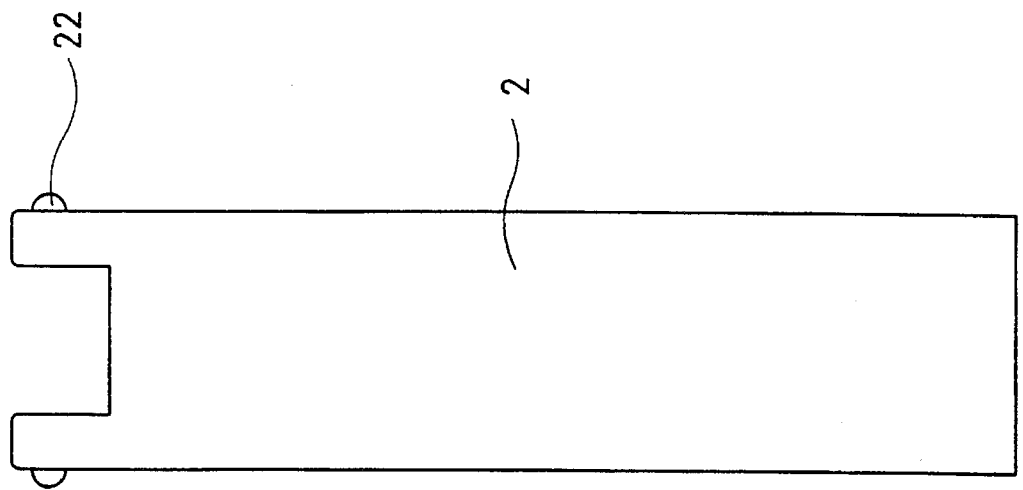
FIG. 1 is a front view of the support member of the clip device of the present invention.
Figure 2:
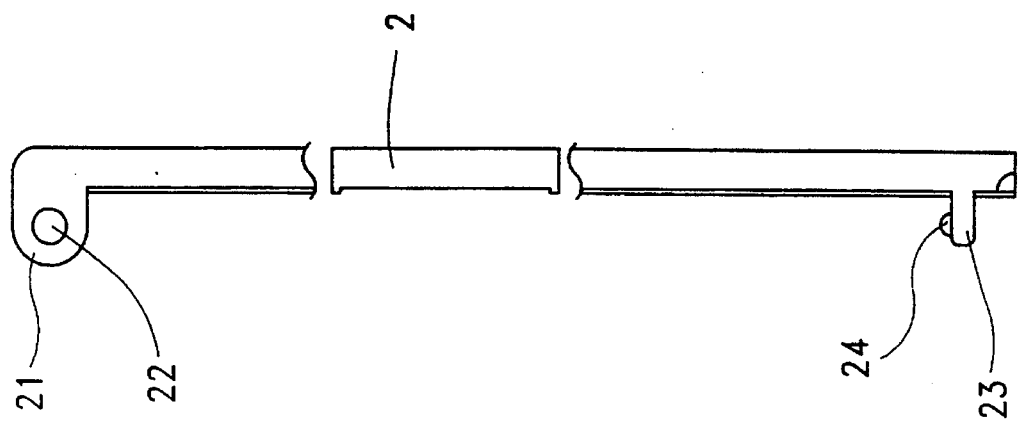
FIG. 2 is a rear view thereof.
Figure 3:
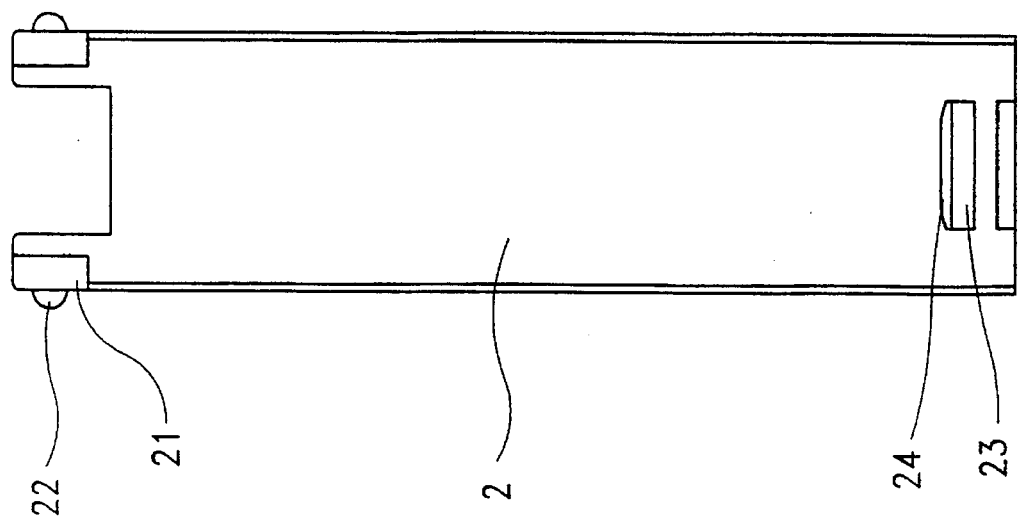
FIG. 3 is a side view thereof.

Please refer to FIGS. 1 to 3. The clip device of the present invention includes a board-like support member 2 having two lugs 21 on two sides of an upper end of the support member 2. Each lug 21 is formed with an integral projecting tenon 22. The support member 2 further has an integral latch section 23 perpendicularly projecting from a lower end of an inner face of the support member 2. A latch tenon 24 is formed on the latch section 23.

Please refer to FIGS. 4 to 6. The clip device further includes a clip member 1 having two dike sections 11 on two sides of a front face and two dike sections 14 on two sides of a back face, which define a first recess 12 on the front face and a second recess 13 on the back face respectively. Two windows 17 are formed on two sides of an upper end of the clip member 1 in the recesses 12, 13. Each of the back dike sections 14 has a triangular projection beside the window 17, which is formed with a mortise 16. Moreover, each back dike section 14 has an integral stopper board 15 at the middle portion thereof. In addition, a notch 18 is formed on the bottom end of the clip member 1.

Figure 7:
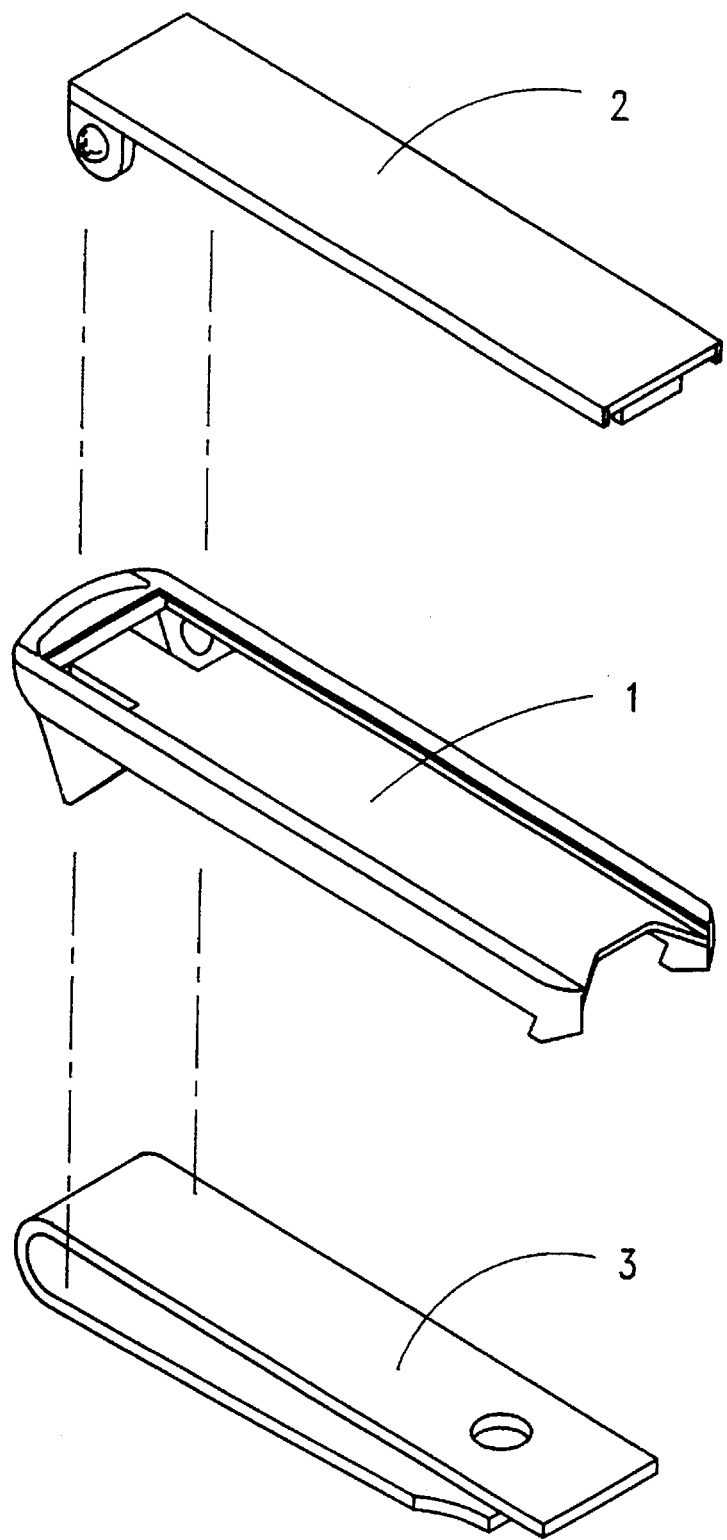
FIG. 7 is a perspective exploded view of the clip device of the present invention.
Figure 7A:
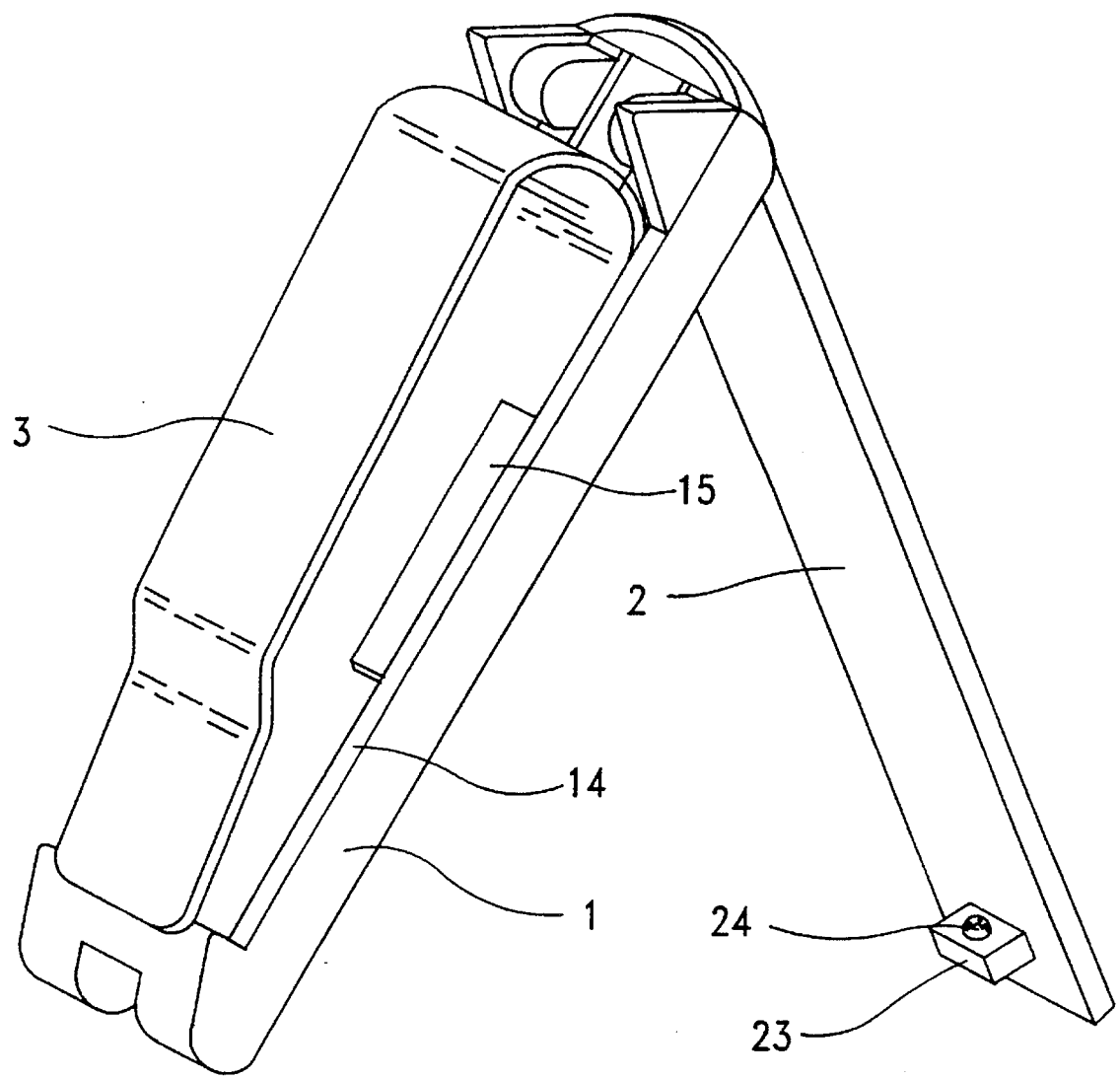
FIG. 7A is a perspective assembled view according to FIG. 7.
Figure 8:
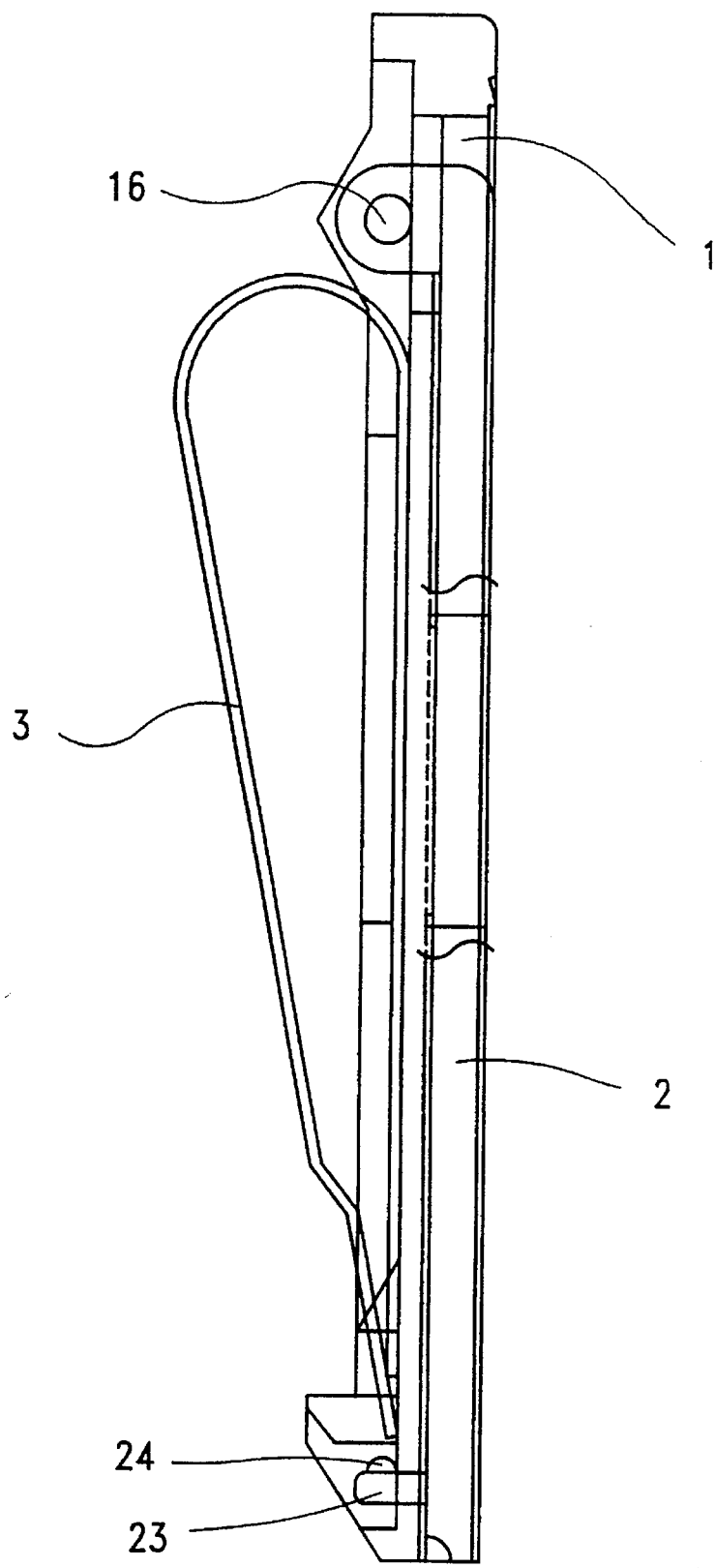
FIG. 8 is a side assembled view according to FIG. 7A.

Please refer to FIGS. 7, 7A and 8. The lugs 21 of the support member 2 can be passed through the windows 17 of the clip member 1 to fit the projecting tenons 24 of the lugs 21 into the mortises 16 of the clip member 1. Accordingly, the support member 2 is able to rotate about the tenons 22 within the mortises 16 of the clip member 1 so that the support member 2 can be pivoted away from the clip member 1 through a certain angle or pivoted into the first recess 12 of the clip member 1. The latch tenon 24 of the latch section 23 on the bottom of the support member 2 serves to engage with the bottom notch 18 of the clip member 1 so as to fix the support member 2 in the first recess 12 of the clip member 1. In addition, the stopper boards 15 of the back dike sections 14 of the clip member 1 together with the second recess 13 define a clipping space for associating with a resilient clip plate 3.

Figure 9:
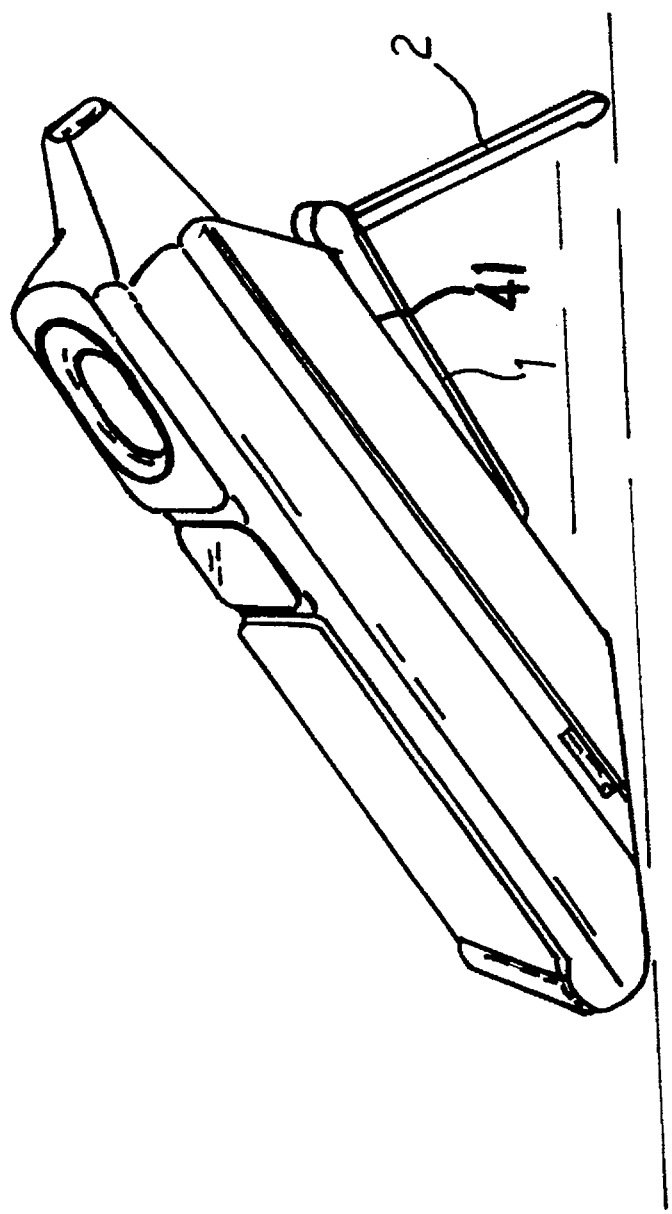
FIG. 9 shows the present invention supporting a mobile phone on a plane surface.
Figure 10:
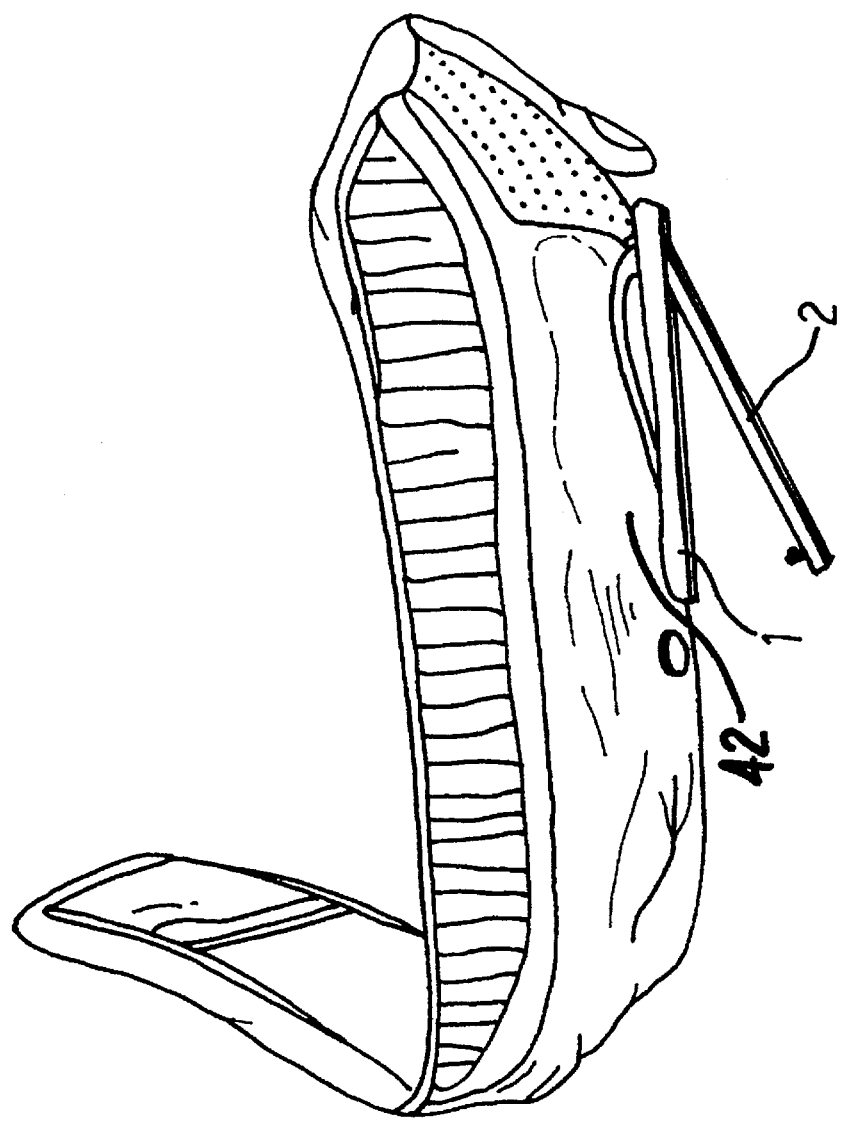
FIG. 10 shows another state of the application of the present.
Figure 10A:
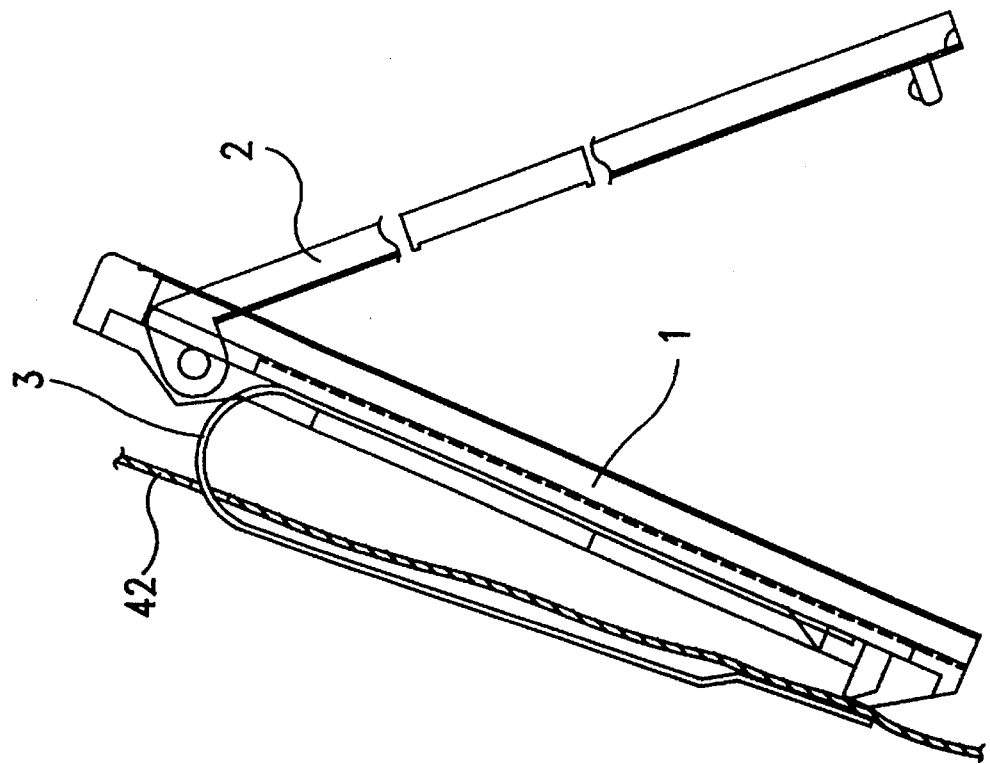
FIG. 10A is a partial side view showing the resilient clip attached to a leather case of a mobile phone or pager.
Figure 9A:
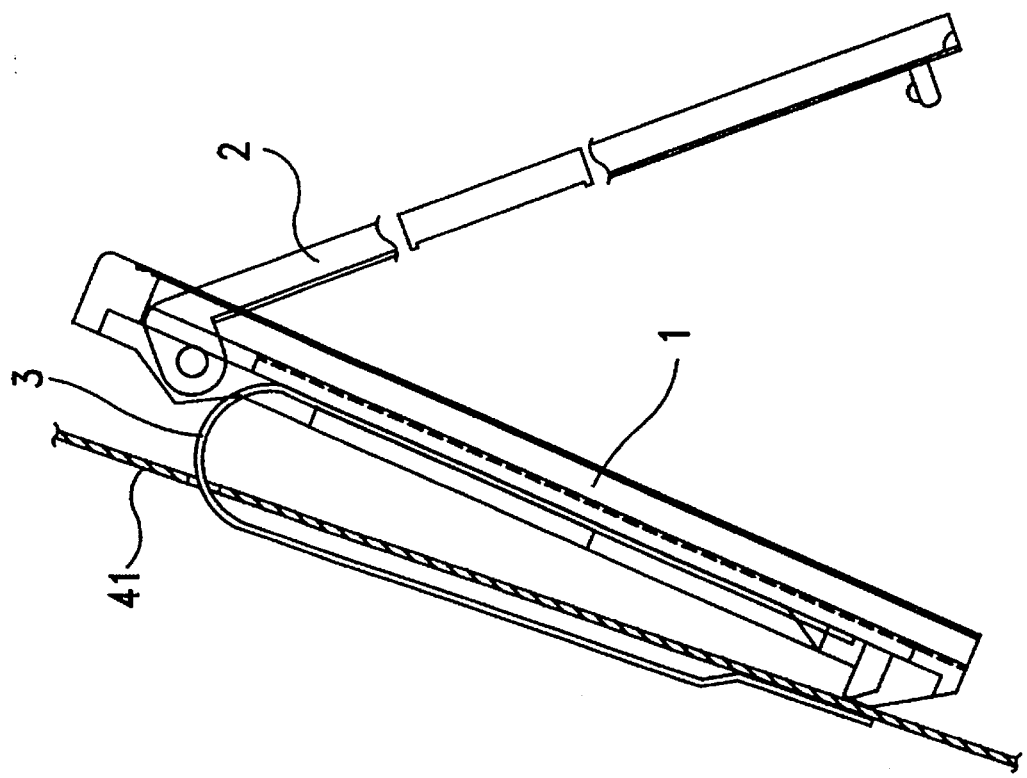
FIG. 9A is a partial side view showing the resilient clip plate attached to a housing of a mobile phone or pager.

According to the above arrangements, the support member 2 is pivotally connected on the front face of the clip member 1 for supporting the same. The resilient clip plate 3 is disposed on the back face of the clip member 1. Referring to FIG. 9, FIG. 9A, the resilient clip plate 3 can be fixed on a housing 41 or a leather case 42 (as shown in FIG. 10 and FIG. 10A) of the mobile telephone or pager, while the clip member 1 serves to clip a belt on the user's waist for facilitating carriage of the telephone. When used, the support member 2 is received in the first recess 12 of the clip member 1. However, when the mobile telephone or pager is not used and placed on a plane surface as a table face, the support member 2 is pivoted apart from the clip member 1 by a certain angle, whereby the support member 2 is able to support the mobile telephone or pager in a position 45 degrees inclined to the plane surface so as to achieve a satisfactory signal receiving ability. In addition, the mobile telephone or pager can be more conveniently placed in various sites in a car or a room.

It is to be understood that the above description and drawings are only used for illustrating one embodiment of the present invention, not intended to limit the scope thereof. Any variation and derivation from the above description and drawings should be included in the scope of the present invention.

What is claimed is:

1. A supporting clip device comprising;

a support member having two lugs on two sides of an upper end of the support member, each lug being formed with an integral projecting tenon, the support member further having an integral latch section perpendicularly projecting from a lower end of an inner face of the support member, a latch tenon being formed on the latch section; and a clip member having two dike sections on two sides of a front face and two dike sections on two sides of a back face, which define a first recess on the front face and a second recess on the back face respectively, two windows formed on two sides of an upper end of the clip member in the recesses, each of the back dike sections having a triangular projection beside the respective window, a mortise formed on each triangular projection, each back dike section having an integral stopper board at a middle portion thereof, a notch being formed on a bottom end of the clip member, whereby the lugs of the support member are receivable through the windows of the clip member to fit the projecting tenons of the lugs into the mortises of the clip member to permit the support member to be pivoted about the projecting tenons away from the clip member through a certain angle or into the first recess of the clip member, the latch tenon of the latch section on the bottom of the support member being engageable with the bottom notch of the clip member for fixing the support member in the first recess of the clip member, and the stopper boards of the back dike sections of the clip member and the second recess collectively defining a clipping space for receiving a resilient clip plate.

2. A supporting clip device as claimed in claim 1, wherein the certain angle that the support member can be pivoted from the clip member is 45 degrees inclined to a plane surface.

* * * * *